United States Patent
Romanetto et al.

(10) Patent No.: US 12,222,005 B2
(45) Date of Patent: Feb. 11, 2025

(54) OPTIMIZED WHEEL HUB ASSEMBLY

(71) Applicant: AKTIEBOLAGET SKF, Gotenborg (SE)

(72) Inventors: Marco Romanetto, Pianezza (IT); Luca Donetti, Turin (IT); Thomas Niestroj, Würzburg (DE); Fausto Morello, Sommariva del Bosco (IT)

(73) Assignee: AKTIEBOLAGET SKF (SE)

( * ) Notice: Subject to any disclaimer, the term of this patent is extended or adjusted under 35 U.S.C. 154(b) by 170 days.

(21) Appl. No.: 17/935,591

(22) Filed: Sep. 27, 2022

(65) Prior Publication Data

US 2023/0102135 A1 Mar. 30, 2023

(30) Foreign Application Priority Data

Sep. 30, 2021 (IT) .................. 102021000024995

(51) Int. Cl.
*F16C 33/58* (2006.01)
*B60B 27/00* (2006.01)
*F16C 19/18* (2006.01)

(52) U.S. Cl.
CPC ........ *F16C 33/586* (2013.01); *B60B 27/0078* (2013.01); *F16C 19/186* (2013.01); *F16C 2326/02* (2013.01)

(58) Field of Classification Search
CPC .. F16C 19/186; F16C 33/586; F16C 2326/02; B60B 27/0078
See application file for complete search history.

(56) References Cited

U.S. PATENT DOCUMENTS

| 2008/0187264 A1* | 8/2008 | Kamikawa ............ F16C 19/186 |
| | | 384/537 |
| 2009/0206649 A1* | 8/2009 | Niebling ................. B60B 27/00 |
| | | 301/110.6 |

(Continued)

FOREIGN PATENT DOCUMENTS

| DE | 102013205429 | 10/2014 |
| JP | 5227158 | 7/2013 |

OTHER PUBLICATIONS

Machine Translation of JP 5227158 (Year: 2013).*
Search Report for corresponding Italy Patent Application No. 102021000024995 dated May 23, 2022.

*Primary Examiner* — Alan B Waits
(74) *Attorney, Agent, or Firm* — Reed Smith LLP

(57) ABSTRACT

A bearing unit having an axis of rotation (X) for a wheel hub assembly for motor vehicles includes stationary radially outer ring, a rotatable wheel hub or first radially inner ring, a rotatable second radially inner ring having an axially external first axial contact edge, an axially internal second axial contact edge having a radially external first contact surface configured to abut a surface of the first radially inner ring, a radially internal second contact surface, and a relief groove interposed radially between the first contact surface and the second contact surface, two rows of rolling bodies interposed between the radially outer ring and the second radially inner ring, and a joint including a bell, the second contact surface contacting a surface of the bell and axial locks the radially inner ring, and the relief groove reducing contact between the second contact edge and the surface of the bell.

18 Claims, 3 Drawing Sheets

(56) References Cited

U.S. PATENT DOCUMENTS

2009/0229379 A1* 9/2009 Ozaki ................... G01L 5/0023
73/862.69
2009/0268998 A1* 10/2009 Fujimura ................ F16C 33/60
384/537

* cited by examiner

Detail A

OPTIMIZED WHEEL HUB ASSEMBLY

CROSS-REFERENCE OF RELATED APPLICATIONS

This application is based on and claims priority to Italian Patent Application No. 102021000024995 filed on Sep. 30, 2021, under 35 U.S.C. § 119, the disclosure of which is incorporated by reference herein.

FIELD

The present disclosure relates to bearing units of a wheel hub assemblies.

BACKGROUND

In wheel hub assemblies, a radially inner ring of a bearing unit may be axial locked due to a contact force with a bell of a joint if the wheel hub assembly. Generally, this ring is axially locked by a surface of the wheel hub on an axially outer side, and by a surface of a bell of a constant-velocity joint of the wheel hub assembly on the axially inner side. An axially outer contact edge of the inner ring that is in contact with the wheel hub may have an area smaller than an area of the axially inner contact edge of the inner ring, namely the edge in contact with the bell of the joint.

BRIEF DESCRIPTION OF THE DRAWINGS

The disclosure will now be described with reference to the attached drawings illustrating non-limiting exemplary embodiments thereof, in which.

DETAILED DESCRIPTION

Figure 1:
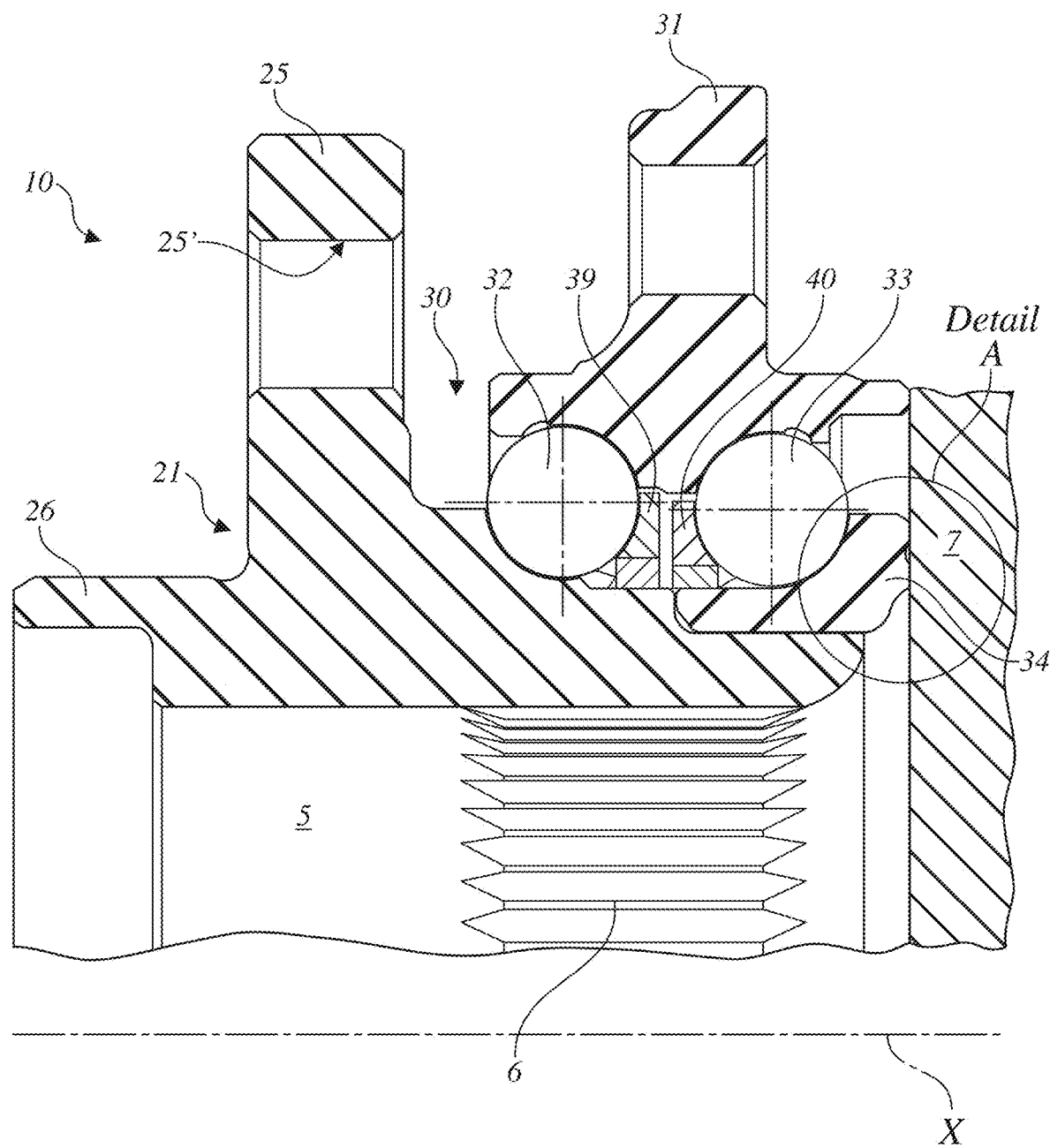
FIG. 1 presents a wheel hub assembly provided with a bearing unit in cross-section.

Wheel hub assemblies provided with a bearing unit for rotatably supporting a wheel of a vehicle on a suspension are known and commonly used. The bearing unit generally includes a pair of rolling bearings, but different configurations of a bearing unit may be applied.

Wheel hub assemblies include a rotatable hub provided with a flange for engaging a rotating element of a motor vehicle, for example a wheel or a disc of a braking element, while a bearing unit comprises an outer ring, a pair of inner rings, one of which may be the hub itself, while the second inner ring is a small radially inner ring, and a plurality of rolling bodies, e.g. balls. All these components have an axial symmetry with respect to an axis of rotation of the rotating components, for example the wheel hub and the second inner ring of the bearing unit.

Also, as a result of ever-increasing global competition, there is demand by continuous technical and cost-related improvements to wheel hub assemblies.

In particular, one unresolved problem is achieving effective axial locking of the radially inner ring, the so-called SIR, i.e. "small inner ring". Generally, this ring is axially locked by a surface of the wheel hub on an axially outer side, and by a surface of a bell of a constant-velocity joint of the wheel hub assembly on the axially inner side. An axially outer contact edge of the inner ring that is in contact with the wheel hub may have an area smaller than an area of the axially inner contact edge of the inner ring, namely the edge in contact with the bell of the joint.

A broader contact area between an axially inner edge and the bell of the constant-velocity joint ensures a contact pressure that is lower and more efficiently distributed. In this way, the performance in terms of rigidity and locking of the radially inner ring and consequently of the entire wheel hub assembly is improved.

Process and manufacturing constraints make increasing this contact area difficult. In particular, grinding operation for both contact edges of the radially inner ring may be performed by means of a single operation. Since a speed of a grinding wheel of a grinding machine may not be different for each contact edge, it may be necessary to ensure that there is a minimum ratio between the contact areas of the axially outer contact edge (e.g., a smaller area) and the axially inner contact edge (e.g., a larger area) so as to avoid problems of grinding burns and in order to achieve acceptable cycle times. This problem is due to the material that must be removed from the contact edge with a larger contact area compared to the amount which must be removed from the contact edge with a smaller area.

A first solution may involve increasing the grinding cycle time or even performing separately the grinding operations on the two contact edges, using two different grinding wheels having two different speed adjustment settings. A solution of this type may not be convenient from the point of view of process times or financial investment which is required.

Another solution, which is design-related, is that of maintaining a higher ratio between the areas of the two side edges of the radially inner ring, whereby the ratio may not be less than 30%. Such a solution, in view of the above comments, is not convenient from the point of view of the performance.

It is therefore necessary to define an original design solution for the bearing unit of a wheel hub assembly, which does not have the aforementioned drawbacks.

In order to solve substantially the aforementioned technical problems, one object of the present disclosure is to provide a bearing unit for a wheel hub assembly provided with a radially inner ring in which a ratio between areas of one or more contact edges is smaller than that of the known wheel hubs, i.e. may be less than 30%. This object may be achieved by defining on an axially inner side of an axially inner ring, i.e. the side which is in contact with the constant-velocity joint, two contact surfaces separated radially by a relief groove.

By so doing, the contact surface between the radially inner ring and the constant-velocity joint is increased, improving performance of the entire wheel hub assembly while avoiding grinding burns during grinding of the axially inner contact edge and controlling the ratio between the area of the one or more contact edges.

With reference to FIG. 1, a wheel hub assembly 10 according to an exemplary embodiment is illustrated.

A wheel hub assembly 10 having a central axis of rotation X can include a rotatable wheel hub 20, and a bearing unit 30. Bearing unit 30 can include a stationary radially outer ring 31, a rotatable radially inner ring 21 which is preferably, but not necessarily rotatable, defined by the hub 20, a second radially inner ring 34 that can be mounted rotatably on and integral with wheel hub 20, two rows of rolling bodies 32, 33 interposed between radially outer ring 31 and radially inner rings 20 and 34, and two cages 39, 40 for containing and keeping in position a plurality of rolling bodies of rows of rolling bodies 32, 33. In various embodiments, rolling bodies can be balls or rollers.

Throughout this disclosure and the claims, the terms and the expressions indicating positions and orientations such as "radial" and "axial" are understood as referring to a central axis of rotation X of bearing unit 30. Expressions such as "axially outer" and "axially inner," instead, refer to an assembled condition of a wheel hub assembly and, in which a wheel side may be axially outer and a side axially opposite the wheel side may be axially inner.

Also, for the sake of simpler graphical illustration, reference numbers 32, 33 may be used to indicate both the individual rolling bodies and the rows of rolling bodies.

In various embodiments, a wheel hub 20 may have an axially outer flanged portion 25. Axially outer flanged portion 25 may have a plurality of axial fixing holes 25'. Axial fixing holes 25' may be configured to receive a bolt, screw, or other fixture securing wheel hub 20 to a wheel of a motor vehicle. In various embodiments wheel hub 20 may have an axially outer cylindrical portion 26 that centers wheel hub 20 about the wheel of the motor vehicle.

In various embodiments, a constant velocity joint 5 may be arranged on an axially external side of wheel hub 20 in a space defined by wheel hub 20 and inner ring 34. A central ring nut 6 may ensure integral rotation of joint 5, wheel hub 20, and inner ring 34. Joint 5 may include a bell 7 configured to clamp radially inner ring 34 in an axial direction. In various embodiments, bell 7 may be located on a radially outer and axially inner side of wheel hub 20.

Figure 2:
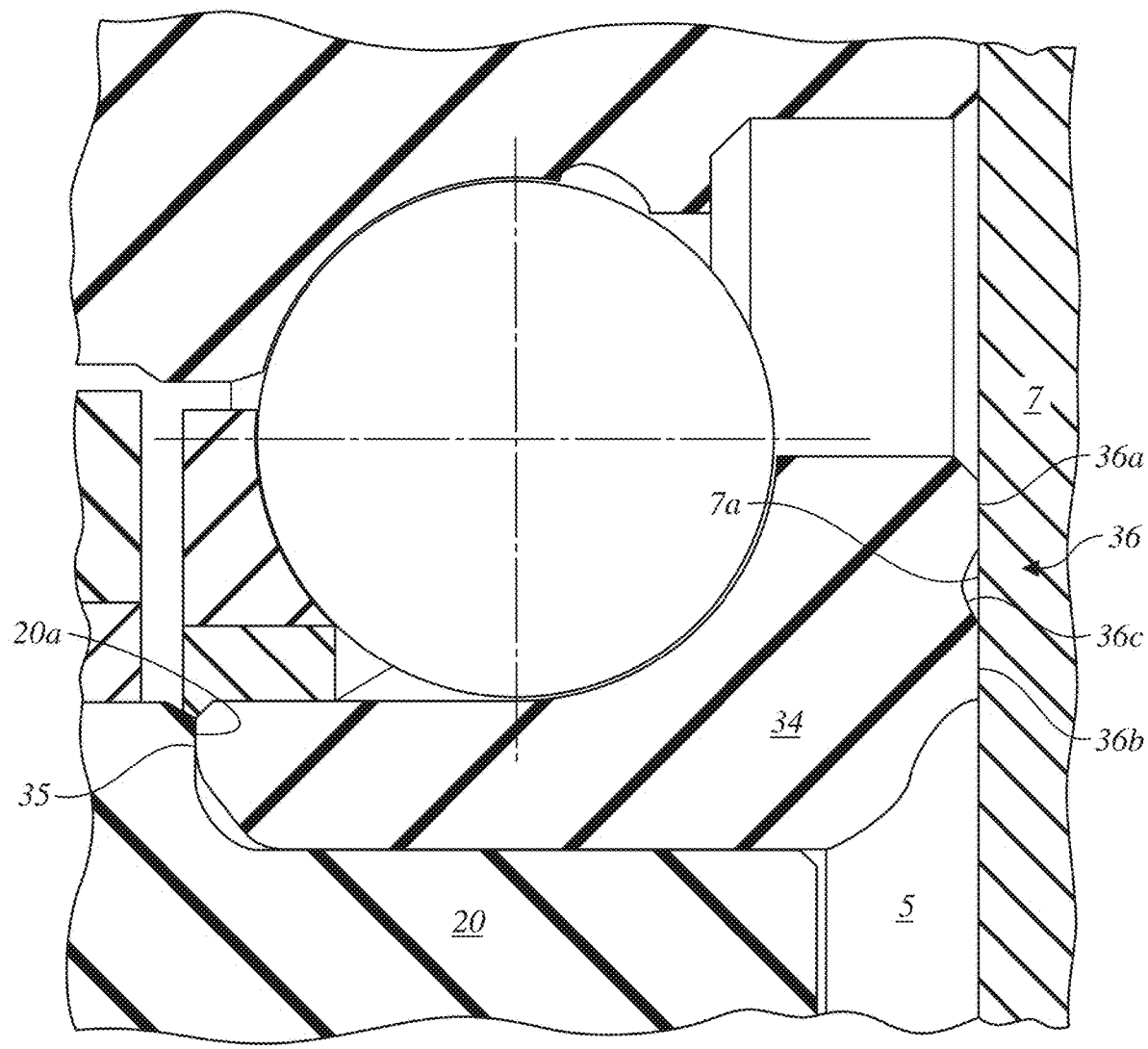
FIG. 2 shows, on a larger scale, an enlarged view of a radially inner ring of the bearing unit of FIG. 1.
Figure 3:
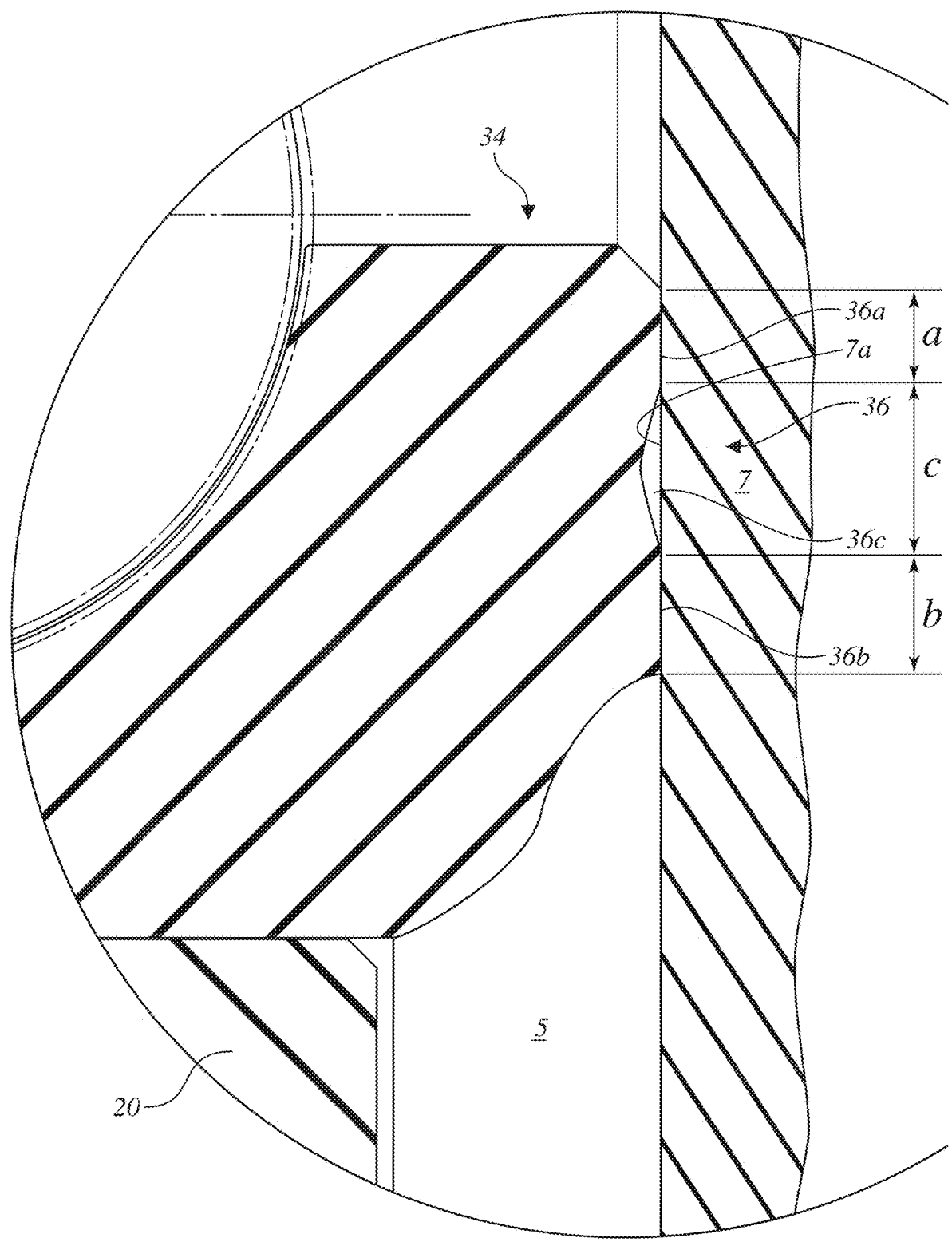
FIG. 3 is an enlarged detail view of a radially inner ring of the bearing unit of to FIG. 1.

With reference to FIGS. 2 and 3, a radially inner ring 34 may have two axial contact edges. In various embodiments, an axially external contact edge 35 may abut a surface 20a of wheel hub 20. Radially inner ring 34 may be axially clamped because of pressure exerted by a surface 7a of bell 7 against axially internal contact edge 36.

In various embodiments, axially internal contact edge 36 may include a radially external contact surface 36a, a radially internal contact edge 36b, and a relief groove 36c interposed radially between contact surfaces 36a and 36b.

By defining two radial contact surfaces of contact edge 36, the pressure exerted by surface 7a of bell 7 may be distributed over a greater radial length, reducing concentrations of contact pressure between joint 5 and radially inner ring 34. In various embodiments, an area of contact edge 36 may be less than or equal to a sum of a contact area of contact surface 36a and a contact area of contact surface 36b.

By interposing groove 36c radially between contact surfaces 36a and 36b, an external diameter of contact edge 36 may be greater at contact surfaces 36a and 36b than an external diameter at groove 36c. This also reduces a quantity of material to be removed in order to form relief groove 36c, allowing an increase in an external diameter of second contact edge 36 to increase at first radially outer surface 36a, which is in contact with surface 7a of bell 7 of joint 5.

In various embodiments, dimensions of contact edge 36 may maximize an area of surface contact with joint 5. Dimensions of contact edge 36 may further be defined such that a ratio of an of contact edge 35 and the sum of the areas of contact surfaces 36 and 36b (i.e. a total contact surface of contact edge 36) is approximately 30% in order to avoid grinding burns.

For example, an axially outer contact edge 35 having an area A and an axially inner contact edge 36 having an area B the area of the axially internal second contact edge 36. If a ratio of A to B is greater than or equal to 30%, then insertion of a relief groove 36c may not be required. If a ratio of A to B is less than 30%, contact edge 36 may be formed with a relief groove interposed radially between a contact surface 36a and a contact surface 36b. By including relief groove 36c, an entire radial height of contact edge 36 may contact joint 5, improving transmission of forces between joint 5 and wheel hub 20.

In order to facilitate formation of a relief groove 36c and maintain a ratio A/B at approximately 30%, an area C, representing a surface missing from area B of contact edge 36 due to relief groove 36c, may be between 15% and 45% of surface B.

A lower bottom limit may not be feasible because it would over complicate a lathe-machining process during manufacturing and, moreover, during subsequent grinding, there may be a risk of eliminating relief groove entirely. A higher top limit, on the other hand, would reduce excessively the contact surface with the joint, eliminating the benefit of the relief groove entirely.

In various embodiments, contact surface 36a may have a radial length "a," contact surface 36b may have a radial length "b," and relief groove may have a radial length "c." In order to maintain a ratio of A/B that is approximately 30% and an area C between 15% and 45%, radial length c may be less than both radial length a and radial length b.

Moreover, a radial position of relief groove 36c may vary. In various embodiments, relief groove 36c may be positioned such that radial length a and radial length b are not equal such that relief groove 36c is not centered between contact surface 36a and contact surface 36b. This helps ensure that the ratio of A/B is approximately 30%. The more relief groove 36c may be located in a radially external position, the greater is the surface which is removed from contact edge 36, and vice versa. In this case, a>b and/or a>c may be implemented.

In various embodiments, radial length b may be greater than radial length a in order to optimize the contact between joint 5 and contact edge 36 when a greater contact surface in the radially internal direction of the ring is required, or vice versa.

An advantage of a wheel hub assembly in accordance with exemplary embodiments of this disclosure is improved stability of the wheel hub assembly. By increasing the contact area between a constant-velocity joint and a radially inner ring, possible rotations of the radially inner ring may be avoided during testing and working cycle applications with heavy loads. Controlling the ratio between the two contact edges avoids grinding burns during grinding of the axially internal contact edge and reduces the number of validation cycles required during fatigue resistance testing.

In addition to embodiments as described above, it must be understood that there exist numerous other variants. It should also be understood that these embodiments are only examples and do not limit either the scope of the disclosure, its applications, nor its possible configurations. On the contrary, although the description above allows a person of ordinary skill in the art to implement the present disclosure at least according to one example embodiment, it must be understood that many variants of the components described are possible without thereby departing from the scope of the disclosure, as defined in the accompanying claims, interpreted literally and/or in accordance with their legal equivalents.

This solution may be applied to all generations of wheel hub assemblies. In particular, such applications include both cases where the outer ring of the bearing is rotatable and the inner rings of the bearing are fixed, and the opposite case where the inner rings rotate and the outer ring is fixed.

We claim:

1. A bearing unit for a wheel hub assembly for motor vehicles, the bearing unit having an axis of rotation (X), the bearing unit comprising:
a stationary radially outer ring;
a rotatable radially inner ring comprising:
a radially inner surface configured to abut a radially outer surface of a wheel hub of the wheel hub assembly;
an axially external first axial contact edge, wherein the radially inner surface and the axially external first axial contact edge are configured to define between them a gap between the radially inner ring and the wheel hub of the wheel hub assembly;
an axially internal second axial contact edge comprising:
a radially external first contact surface configured to abut a surface of a bell of a joint of the wheel hub assembly;
a radially internal second contact surface; and
a relief groove interposed radially between the first contact surface and the second contact surface, wherein a surface of the relief groove slopes axially outward from the first and second contact surfaces to an axially outermost point of the relief groove; and
two rows of rolling bodies configured to be interposed between the radially outer ring and the wheel hub;
wherein the second contact surface is configured to contact the surface of the bell of the joint of the wheel hub assembly and axially lock the radially inner ring between the bell and the wheel hub.

2. The bearing unit of claim 1, wherein a ratio between an area (C) of the relief groove and an area (B) of the second contact edge is between 15% and 45%, inclusive.

3. The bearing unit of claim 2, wherein a radial length (c) of the relief groove is greater than a radial length (a) of the first contact surface, and wherein the radial length (c) of the relief groove is greater than a radial length (b) of the second contact surface.

4. The bearing unit according to claim 2, wherein a radial length (a) of the first contact surface is greater than a radial length (b) of the second contact surface.

5. The bearing unit according to claim 2, wherein a radial length (a) of the first contact surface is less than a radial length (b) of the second contact surface.

6. The bearing unit according to claim 2, wherein a radial length (c) of the relief groove is less than a radial length (a) of the first contact surface.

7. The bearing unit of claim 1, wherein a ratio between an area (C) of the relief groove and an area (B) of the second contact edge is between 20% and 40%, inclusive.

8. The bearing unit of claim 1 wherein a radial length (c) of the relief groove is greater than a radial length (a) of the first contact surface, and wherein the radial length (c) of the relief groove is greater than a radial length (b) of the second contact surface.

9. The bearing unit of claim 1, wherein a radial length (a) of the first contact surface is greater than a radial length (b) of the second contact surface.

10. The bearing unit of claim 1, wherein a radial length (a) of the first contact surface is less than a radial length (b) of the second contact surface.

11. The bearing unit of claim 1, wherein a radial length (c) of the relief groove is less than a radial length (a) of the first contact surface.

12. A wheel hub assembly for motor vehicles, the wheel hub assembly comprising:
a wheel hub;
a constant velocity joint comprising a bell; and
a bearing unit, the bearing unit comprising:
a stationary radially outer ring;
a rotatable radially inner ring comprising:
a radially inner surface abutting a radially outer surface of the wheel hub;
an axially external first axial contact edge abutting an axially internal surface of the wheel hub, wherein a gap is defined between the wheel hub and the radially inner ring at a portion between the radially inner surface of the radially inner ring and the axially external first axial contact edge;
an axially internal second axial contact edge comprising:
a radially external first contact surface abutting a surface of the bell;
a radially internal second contact surface; and
a relief groove interposed radially between the first contact surface and the second contact surface, wherein a surface of the relief groove slopes axially outward from the first and second contact surfaces to an axially outermost point of the relief groove; and
two rows of rolling bodies interposed between the radially outer ring and the wheel hub and the radially inner ring;
wherein the axially internal second axial contact edge contacts the surface of the bell and axially locks the radially inner ring between the bell and the wheel hub, and
wherein the relief groove reduces contact between the second contact edge and the surface of the bell.

13. The wheel hub assembly of claim 12, wherein a ratio between an area (C) of the relief groove and an area (B) of the second contact edge is between 15% and 45%, inclusive.

14. The wheel hub assembly of claim 13, wherein a radial length (c) of the relief groove is greater than a radial length (a) of the first contact surface, and wherein the radial length (c) of the relief groove is greater than a radial length (b) of the second contact surface.

15. The wheel hub assembly of claim 13, wherein a radial length (a) of the first contact surface is greater than a radial length (b) of the second contact surface.

16. The wheel hub assembly of claim 13, wherein a radial length (a) of the first contact surface is less than a radial length (b) of the second contact surface.

17. The wheel hub assembly of claim 13, wherein a radial length (c) of the relief groove is less than a radial length (a) of the first contact surface.

18. The wheel hub assembly of claim 12, wherein a ratio between an area (C) of the relief groove and an area (B) of the second contact edge is between 20% and 40%, inclusive.

* * * * *